United States Patent [19]

Berge et al.

[11] Patent Number: 5,362,826

[45] Date of Patent: * Nov. 8, 1994

[54] METHOD OF PREPARING MACRMONOMER COMPOSITIONS

[75] Inventors: Charles T. Berge, Wilmington, Del.;
Michael J. Darmon, Aston, Pa.;
Joseph A. Antonelli, Riverton, N.J.

[73] Assignee: E. I. Du Pont de Nemours and Company, Wilmington, Del.

[ * ] Notice: The portion of the term of this patent subsequent to Nov. 23, 2010 has been disclaimed.

[21] Appl. No.: 104,958

[22] Filed: Aug. 9, 1993

Related U.S. Application Data

[63] Continuation of Ser. No. 876,764, May 1, 1992, Pat. No. 5,264,530.

[51] Int. Cl.$^5$ .............................................. C08F 2/42
[52] U.S. Cl. ................................ 526/194; 526/204;
526/201; 526/206; 526/207; 526/209; 526/213;
526/215; 526/217
[58] Field of Search ............... 526/194, 213, 201, 206,
526/207, 209, 215, 217, 204

[56] References Cited

U.S. PATENT DOCUMENTS

| | | | |
|---|---|---|---|
| 3,382,297 | 5/1968 | Thompson | 526/201 |
| 3,968,059 | 7/1976 | Shimate et al. | 526/68 |
| 4,170,582 | 10/1979 | Mori et al. | 526/273 |
| 4,518,726 | 5/1985 | Kato et al. | 524/32 |
| 4,526,945 | 7/1985 | Carlson et al. | 526/145 |
| 4,547,323 | 10/1985 | Carlson | 260/465.4 |

(List continued on next page.)

FOREIGN PATENT DOCUMENTS

| | | | |
|---|---|---|---|
| 0261942 | 3/1988 | European Pat. Off. | |
| 0268705 | 6/1988 | European Pat. Off. | 526/201 |
| 0331999 | 9/1989 | European Pat. Off. | 526/201 |
| 53-84092 | 7/1978 | Japan | 526/201 |
| 5384092 | 7/1978 | Japan | |
| 56-139504 | 10/1981 | Japan | 526/201 |
| 328202 | 2/1991 | Japan | 526/201 |
| 3028202 | 2/1991 | Japan | |

(List continued on next page.)

OTHER PUBLICATIONS

"Reactivity of Macromonomers in Free Radical Polymerization" JMS Rev. Macromol. Chem. Phys. C30(3&4) 305-377 (1990).

"The Chemistry of Unsaturated Oligomers and Polymers" David Scott Harrison, B. App. Sc. Jun. 1988 2-103.

Polymer Bulletin "The Use of Model Compounds in Interpreting the Thermal Degradation of Poly(Methyl Methacrylate" 325-328 (1984).

"Catalyzed Chain Transfer to Monomer in Free Radical Polymerization" N. S. Enikolopyan, B. R. Smirnov, G. V. Ponomarev and I. M. Belgovskii 879-889 (1981).

"Polym Mater Sci. Eng." 1986, SS., None, pp. 235-238. Reactive Dimers of . . . : Abbey K. J. G. M. Carlson.

"Copolymerization of Unsaturated Oligo(Methyl Methacrylate: New Macromonomers" P. Cacioli: 839-852 (1986).

(List continued on next page.)

Primary Examiner—Joseph L. Schofer
Assistant Examiner—N. Sarofim
Attorney, Agent, or Firm—Chris P. Konkol

[57] ABSTRACT

A method of preparing macromonomer compositions of a limited average molecular weight containing an olefinic polymerizable end group. The macromonomers may suitably comprise the polymerization product of methacrylate, methacrylonitrile, and methacrylamide monomers, derivatives thereof, and mixtures of such monomers.

23 Claims, No Drawings

U.S. PATENT DOCUMENTS

| | | | |
|---|---|---|---|
| 4,621,131 | 11/1986 | Lin et al. | 528/192 |
| 4,680,352 | 7/1987 | Janowicz et al. | 526/120 |
| 4,694,054 | 9/1987 | Janowicz | 526/120 |
| 4,808,656 | 2/1989 | Kania et al. | 524/558 |
| 4,965,317 | 10/1990 | Kania et al. | 525/155 |

FOREIGN PATENT DOCUMENTS

| | | | |
|---|---|---|---|
| 3161592 | 7/1991 | Japan . | |
| 3161593 | 7/1991 | Japan . | |
| 1083486 | of 1913 | United Kingdom | 526/201 |
| 870191 | 6/1961 | United Kingdom | 526/201 |
| 2161170 | 1/1986 | United Kingdom | 526/201 |
| 8103334 | 11/1981 | WIPO | 526/201 |
| WO8103334 | 11/1981 | WIPO . | |

OTHER PUBLICATIONS

"Catalytic Chain-Transfer in Polymerization of Methyl Methacrylate I. Chain-Length Dependence of Chain-Transfer Coefficient" R. Amin Sanayei (1989) 1137-1149.

"Polymerization Reactivity of Unsaturated End Group Generated during the Disproportional in Termination Reaction of Methyl Methacrylate Polymerization"; Tanaka 1761-1768.

"Macromomer Prepared by Polymerization of Methyl Methacrylate in the Presence of Ethyl α-bromomethyl-)acrylate" Bunichro Yamada 513-518. (1990).

"Catalytic Chain Transfer in Polymerization of Methyl Methacrylate II Continuous Synthesis and Purification of Macromer" K. G. Suddaby, 1565-1575 (1991).

"Dimethyl 1-Hexene-2,5-Dicarboxyate, Methyl Methacrylate,P. Mer. 95 Polymerizable Acrylic Ester Substituent" Tasayuki, Otsu 837-842 (1991).

"Preparation of poly(Methyl Methacrylate) Radical Polymerization in the Presence of Methyl Acrylate and Copolymerization of the Resultant " 423-430 (1991) Bunichiro Yamada.

METHOD OF PREPARING MACRMONOMER COMPOSITIONS

CROSS-REFERENCE TO RELATED APPLICATION

This application is a continuation of U.S. patent application Ser. No. 07/876,764, filed May 1, 1992 now U.S. Pat. No. 5,264,530.

BACKGROUND OF THE INVENTION

1. Field of the Invention

This invention relates to a method of preparing compositions of homopolymers and copolymers of limited molecular weight, referred to as macromonomers, which contain an olefinic polymerizable end group wherein the monomeric units comprise methacrylate, methacrylonitrile, methacrylamide, derivatives thereof, and other monomers and mixtures thereof.

2. Background

Macromonomers, that is, polymers containing an olefinic polymerizable end group, are known in the art. For example, U.S. Pat. No. 5,028,677 discloses a process of obtaining compositions containing a higher percentage of macromonomer in order to permit more effective utilization of these compounds in the production of graft polymers and other polymeric moieties.

In producing macromonomers, as to some extent in producing polymers in general, it is necessary to be able to control the molecular weight of the product of polymerization so that it may be fitted to its particular use or need. Unperturbed polymerization systems fundamentally tend to produce high molecular weight polymers, whereas it may be desirable or necessary, as in the case when producing macromonomers, to limit the molecular weight of the polymerization product. This must be done in a fairly predictable and controllable fashion.

For free radical polymerization processes, there are a number of conventional means of effecting such molecular weight limitation. These, along with notable disadvantages or problems, include (1) A high initiator/monomer ratio. However, this may be costly in terms of initiator consumption. Also, high initiator levels may also produce undesirable end groups on the polymers produced.

(2) Polymerization at high temperatures. However, this may lead to undesirable depropagation, thermal initiation, and undesirable secondary reactions.

(3) Adding stoichiometric amounts of thiol chain transfer agents to the polymerizing system. However, the attendant incorporation of sulfur-containing agents into the polymer may render it less durable than is desired. There may also be odor problems associated with the use of sulfur-containing chain transfer agents.

(4) Chain transfer agents employing cobalt (II or III) chelates such as disclosed in U.S. Pat. No. 4,680,352, U.S. Pat. No. 4,694,054, and WO 87/03605 published Jun. 18, 1987. However, a possible disadvantage of these agents is that some are adversely affected or deactivated by low pH. Also, they may tend to cause color problems, especially if interaction with some monomers may require higher levels of the cobalt chelate.

(5) Group transfer agents such as disclosed in U.S. Pat. Nos. 4,417,034 and 4,414,372 or European patent application publication 0 248 596. However, they are specific to methacrylated polymers and relatively expensive. They are also sensitive to certain monomers and impurities which contain active hydrogens, e.g., hydroxyl, carboxyl, carboxylic acid, or amine. Special solvents may be required or blocked hydroxyl and carboxyl monomers may be needed which require a special deblocking step to activate the protected group.

The use of terminally or $\omega$-ethylenically unsaturated oligomers as chain transfer agents, for controlling the molecular weight of certain polymers in some contexts, is also known. There have been a number of studies and articles on the chain transfer properties of such oligomers.

Such oligomers are known, for example, as disclosed in U.S. Pat. No. 4,547,327; U.S. Pat. No. 4,170,582; U.S. Pat. No. 4,808,656, Japanese patent 3,161,562; Japanese patent 3,161,593. See also, P. Cacioli, et al., *J. Makromol. Sci.-Chem.*, A23 (7), 839-852 (1986) and H. Tanaka, et al., *Journal of Polymer Science; Part A*; Polymer Chemistry, 27, 1741-1748 (1989).

It is an object of this invention to provide a method of polymerization to obtain macromonomers by employing a $\omega$-unsaturated oligomer as a chain transfer agent.

It is a further object to control the molecular weight of the macromonomer so produced.

The present invention avoids problems associated with chain transfer agents which have been previously in commercial use, for example in the production of coatings and finishes. The present method has a number of significant advantages, including lower polymerization temperatures, reduced initiator costs, and less color. In general, the present method thus has the advantage of reducing the variables that narrow the utility of commonly used chain transfer agents or techniques that are commonly used.

These and other objects will become apparent hereinafter.

DETAILED DESCRIPTION OF THE INVENTION

This invention is directed to a method of preparing compositions of macromonomers containing an olefinic polymerizable end group. The term "macromonomer" is used herein to describe polymers of limited chain length or molecular weight which have such terminal olefinic moieties. The present macromonomers have about 10 to about 800 monomeric units linked to the end group, the units being independently selected from the monomeric units described below. In some cases, for reasons of commercial applicability and/or ease of synthesis, macromonomers having at least 10 and up to about 300 monomeric units are preferred. The number average molecular weight can vary from about 1000 to 50,000, preferably 1,000 to 10,000.

The present macromonomers comprise monomeric units corresponding to the monomers or comonomers in the polymerization reaction mixture which comprise, by weight, 80 to 100% of methacrylates of the formula $CH_2=C(CH_3)CO_2J$ wherein J is H, $C_1$-$C_{12}$ alkyl, $C_2$-$C_{12}$ alkenyl, glycidyl, $C_2$-$C_{12}$ hydroxyalkyl, allyloxyethyl, 2,4-hexadienyl, $C_xH_{(2x+1-y)}$ $F_y$ where x is 1 to 16 and y is 0 to $2x+1$, $R_6R_7N(CH_2)_z$ where $R_6$ and $R_7$ are independently $C_1$ to $C_{12}$ alkyl and z is 1 to 10, or $R_8R_9R_{10}Si(CH_2)_z$ where $R_8$, $R_9$ and $R_{10}$ are independently $C_1$ to $C_{12}$ alkyl or $C_1$ to $C_{12}$ alkoxy and z is 1 to 10. In addition the monomers may comprise methacrylonitrile, maleic anhydride, fumarate derivatives such as fumaronitrile, dialkylfumarate and fumaric acid; methacrylamide derivatives of the formula $CH_2=C(CH_3)CON(R)_2$ wherein each R is independently H, $C_1$ to $C_{10}$ alkyl or $(CH_2)_nZ$, n is an integer from 1 to 10, Z is COOY, OH, $N(R_1)_2$, $SO_3Y$ and Y is H, Li, Na, K, or $N(R)_4$; vinyl esters and acetates of the formula $CH_2=CHOOCR$, wherein R is $C_1$ to $C_{12}$ alkyl; and any and all monomer mixtures thereof. In the preferred embodiment, in which the monomers making up the monomeric units of the macromonomer preferably comprise 80-100% of methacrylate acid or alkyl esters or functional alkyl esters thereof, according to the above formula having J as a group, particularly preferred functional alkyl esters are those where J according to the above formula is silyl, glycidyl or hydroxy alkyl. In general herein, $C_1$ to $C_{12}$ moieties or groups are preferably $C_1$ to $C_6$, most usually preferably $C_1$ to $C_4$ moieties.

The monomers forming the macromonomer may also comprise minor amounts of styrene and acrylates and derivatives thereof. In another embodiment, the monomers may further comprise up to 20% of the following monomers: vinyl halides of the formula $CH_2=CHX$ wherein X is Cl or F, vinylidene halides of the formula $CH_2=C(X)_2$ wherein each X is independently Cl or F, substituted butadienes of the formula $CH_2=C(R)C(R)=CH_2$ wherein each R is independently H, $C_1$ to $C_{10}$ alkyl, Cl or F, ethylenesulfonic acid derivatives of the formula $CH_2=CHSO_3X$ wherein X is Na, K, Li, $N(R)_4$, H, R or $(CH_2)_n Z$ where n is an integer from 1 to 10, Z is COOY, OH, $N(R)_2$, or $SO_3Y$, Y is H, Li, Na, K or $N(R)$ and R is independently $C_1$ to $C_{10}$ alkyl, acrylamide derivatives of the formula $CH_2=CHCON(R)_2$ wherein each R is independently H, $C_1$ to $C_{10}$ alkyl, or $(CH_2)_nZ$, n is an integer from 1 to 10, Z is COOY, OH, $N(R_1)_2$ or $SO_3Y$ and Y is H, Li, Na, K or $N(R_1)_4$ where R is $C_1$ to $C_{10}$ alkyl.

The methacrylates described above would thus include branched alkyl or n-alkyl esters of $C_1$-$C_{12}$, alcohols (for example, methyl and ethyl methacrylate), methacrylic acid, and allyl, glycidyl, hydroxyalkyl (for example, hydroxyethyl and hydroxypropyl), allyloxyethyl, 2,4-hexadienyl (sorbyl), dialkylaminoalkyl, fluoroalkyl, and trialkylsilylalkylene methacrylates.

Of the contemplated monomers or comonomers, preferred for reasons of commercial applicability, cost, and/or ease of synthesis are the methacrylates.

As one skilled in the art would recognize, however, each monomer must have polymerizing compatibility with any adjacent monomers. "Polymerizing compatibility: as used herein, is determined by taking into account the steric and electronic properties of particular monomers. The polymerizing compatibility of various monomers is well-documented in the art. See, e.g., Young, L. H. "Copolymerization Reactivity Ratios" in Polymer Handbook, J. Brandrup and E. H. Immergut, eds., John Wiley & Sons, Inc. (1975). For example, α-methyl styrene does not have polymerizing compatibility with itself in free radical polymerizations above 60° C. and therefore cannot form homopolymers under these conditions. Thus, in a macromonomer, α-methyl styrene may not occur adjacent to another α-methyl styrene under such reaction conditions. Also, maleic anhydride, fumaronitrile, dialkyl fumarate and fumaric acid do not have any polymerizing compatibility with themselves or with each other via free radical polymerization. Thus, for example, in a macromonomer, maleic anhydride may not occur adjacent to another maleic anhydride, fumaronitrile, dialkyl fumarate or fumaric acid.

The concentration of macromonomers in the claimed composition is at least about 80 mol %. Preferably are contemplated are concentrations of at least about 85 mol %, more preferably at least about 90 mol %, most preferably at least about 95 mol % and any and all concentrations and ranges of concentrations therebetween, and up to about 100 mol %.

The macromonomers prepared according to the present invention can be employed to produce graft polymers, non-aqueous dispersed polymers, microgels, star polymers, branched polymers, ladder polymers and block polymers. The products of such macromonomers are therefore useful in a wide variety of coating and molding resins. Other potential uses can include cast, blown, spun or sprayed applications in fiber, film, sheet, composite materials, multilayer coatings, photopolymerizable materials, photoresists, surface active agents including soil repellants and physiologically active surfaces, inks, adhesives, adhesion promoters and coupling agents, among others. End products taking advantage of available characteristics can include lacquers, enamels, electrocoat finishes, high solids finishes, aqueous or solvent based finishes, clear or filled acrylic sheet or castings, including automotive and architectural glazing and illumination housings and refractors, additives for oil and fuel, including antimisting agents, outdoor and indoor graphics including signs and billboards and traffic control devices, reprographic products and many others.

For example, using standard polymerization techniques, graft polymers can be synthesized by reacting one or more macromonomers according to the present invention with one or more monomers having polymerizing compatibility with the macromonomers and with each other.

The present invention is directed to a method of free radical polymerization of a desired monomer composition, to produce a wide variety macromonomers made from olefins such as methacrylic acids and their esters or amides and derivatives thereof. The invention may also be applicable to olefins such as ethylene, propylene or butadiene, halogenated vinyls such as vinyl chloride or vinyl fluoride, vinylidene fluoride, vinyl ether, tetrafluoroethylene, styrene, acrylic, chloroprene, vinyl acetate, acrylonitrile, and/or mixtures thereof.

According to the present invention, macromonomers are produced by a process which employs, as a free radical chain transfer agent, relatively low molecular weight oligomers having ω-unsaturation (which oligomers are, in fact, themselves macromonomers of a relatively limited degree of polymerizaiton or chain length). These oligomers may themselves be made with a metal chelate or other suitable chain transfer catalyst. However, although less preferred, it is contemplated that ω-unsaturated oligomers, having at least two monomeric units, might also be prepared without polymerization, according to a known or routine organic synthesis. Hence, the term "oligomer" or "oligomeric" does not herein connote a compound necessarily prepared by polymerization.

The oligomeric chain transfer agents employed in the present invention may be a pure compound or a polydisperse mixture of compounds. These materials have utility either alone or as blends when used as chain transfer agents for virtually any free radical polymerization.

Preferably, the present chain transfer agents are used as a polydisperse mixture, which mixture has a distribution of molecular weights having a very low degree of polymerization, i.e., DP=2 to 100, preferably 2 to 20, and most preferably 2 to 7.

The oligomer chain transfer agents of interest, as well as the polymers or macromonomers produced thereby, include those having the following end group:

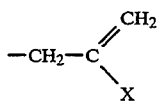

where X is —CONR$_2$, —COOR, OR$^1$, —OCOR, —O-COOR$^1$, —NRCOOR$^1$, halo, cyano, or a substituted or unsubstituted phenyl or aryl, wherein each R is independently selected from the group of hydrogen, silyl, or a substituted or unsubstituted alkyl, alkyl ether, phenyl, benzyl, or aryl, wherein said groups may be substituted with epoxy, hydroxy, isocyanato, cyano, amino, silyl, acid (—COOH), halo, or acyl; and wherein R$^1$ is the same as R except not H; wherein each alkyl is independently selected from the group consisting of branched, unbranched, hydrocarbons having 1 to 12, preferably 1–6, and most preferably 1–4 carbon atoms or cyclical hydrocarbons having 4–12, preferably 4–6 carbon atoms; halo or halogen refers to bromo, iodo, chloro and fluoro, preferably chloro and fluoro, and silyl includes —SiR$^2$(R$^3$)(R$^4$) and the like, wherein R$^2$, R$^3$, and R$^4$ are independently alkyl, phenyl, alkyl ether, or phenyl ether, preferably at least two of R$^2$, R$^3$, and R$^4$ being a hydrolyzable group, more preferably two of which are alkyl ether, wherein alkyl is as defined above, preferably methyl or ethyl. A plurality of silyl groups may be condensed, for example, an organopolysiloxane such as —Si(R$^2$)$_2$—O—Si(R$^3$)$_2$R$^4$, wherein R$^2$, R$^3$, and R$^4$ are independently alkyl. See U.S. Pat. No. 4,518,726, hereby incorporated by reference, for further exemplification of silyl groups in general.

A preferred class of oligomeric chain transfer agents for use in the present invention are those oligomers according to the above structure in which X is —CONR$_2$, —COOR, unsubstituted or substituted phenyl, aryl, halo, or cyano, and R is as defined above.

A more preferred class of oligomeric chain transfer agents for use in the present invention are those oligomers according to above structure in which X is —COOR or phenyl and R is hydrogen, alkyl or phenyl unsubstituted or substituted with epoxy, hydroxy, or alkoxysilyl.

The oligomers employed in the present invention are to be distinguished from the more conventional oligomers having the following end group:

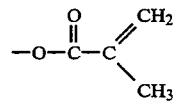

Preferably, the oligomers employed in the present invention, as well as the polymers produced thereby, are characterized by the following end group:

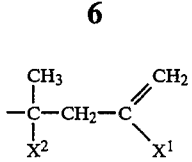

wherein X$^1$ and X$^2$ are independently (the same or different) X as defined above.

The general chemical structure of suitable oligomers for use in the present invention is described below where n=2 to 100 on average.

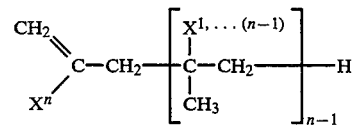

wherein X$^1$ to X$^n$ is independently defined as above for X and n is on average 2 to 100, preferably 2 to 20.

For example, a general formula for a methacrylate oligomeric chain transfer agent is as follows:

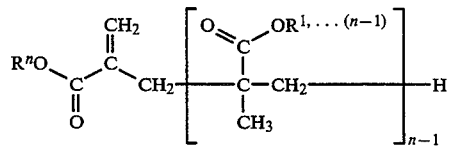

wherein R$^1$ to R$^n$ are independently (the same or different) and defined as above for R and n is on average 2 to 20, preferably 2 to 7.

As a further very specific example, a methyl methacrylate trimer, wherein n equals 3 and R equals —CH$_3$, is as follows.

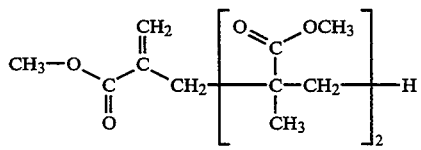

As indicated above, dimers, trimers, tetramers, etc., as defined above, or mixtures thereof, are suitably employed in the present invention. Mixtures of varying molecular weight are probably easier to prepare in large quantities. A wide range of molecular weight oligomers may be made, which in turn may be distilled to obtain a purer or pure oligomer, for example the tetramer. The oligomers do not have to be in any particular form. The oligomers may be stored and added in bulk, as liquids or solids, mixed in a solvent, mixed with monomers.

Many of the oligomers that can be employed in the present process, are known, for example as taught in Janowicz published European Patent Application 0 261 942, herein incorporated by reference. The alphamethyl styrene dimer, which is the same as the compound 2,4-diphenyl-4-methyl-1-pentene, is known as a chain transfer agent, although its preparation by a polymerization process, for example a metal chelate chain transfer process, or its inclusion in a molecular weight distribution is not believed conventional. The claimed invention does not include the use of the pure dimer, i.e. a compound according to the above formula when n is 2 and X is phenyl, but does not exclude a distribution of such macromonomers that may include that particular compound. However, chain transfer agents with such a phenyl or aryl group may be less preferred for reasons of the properties of the resulting polymers as a consequence of the presence of aromatic end groups derived from the chain transfer agent. It may be preferred to exclude or reduce the amount of the dimer oligomer, where n equals 2 in the above formulas, because such dimer may be somewhat less reactive than other oligomeric chain transfer agents.

According to the present invention, suitable oligomeric chain transfer agents are dimers, trimers, tetramers, and higher oligomers of monomers and mixtures thereof. Thus, oligomers comprising branched, unbranched or cyclical alkyl or aromatic methacrylates such as methyl, ethyl, propyl, butyl, 2-ethylhexyl, and/or decyl methacrylate; cyclohexyl, phenyl, or benzyl methacrylate; functional alkyl or aromatic methacrylates such as glycidyl methacrylate, hydroxyethyl or hydroxypropyl methacrylate, methacrylic acid, methacrylonitrile, methacrylamide, 2-isocyanatoethyl methacrylate, dimethylaminoethyl methacrylate, N,N-dimethylamino-3-propyl methacrylamide, t-butylaminoethyl methacrylate, and silanes such as methacryloxypropyltrimethoxysilane, or mixtures of the foregoing, and numerous others can be employed. Hetero-oligomers, as for example, the reaction product of methylmethacrylate and methacrylonitrile are suitable. These oligomers are most easily made by a metal chelate catalytic chain transfer, for example a cobalt chelate, as will be explained below, but they could be made by other methods as well.

The present oligomeric chain transfer agents can be used, for example to control molecular weight during polymerization of acrylic and other monomers, in an effective amount of only a few percent by weight of the oligomer present in the monomer mixture. A suitable range of oligomeric chain transfer agent is between 0.01% and 80% by weight, preferably about 0.1 to 40%, and most preferably 1 to 10% by weight of the monomer reactants.

As indicated earlier, the macromonomers made according to the present invention have wide utility, especially for use in coatings (particularly high performance coatings such as automotive finishes and industrial maintenance coatings), inks, adhesives, and sealants, or basically wherever one skilled in the art would use a low molecular weight, low dispersity polymeric material. Such final products or compositions can have advantageous structural characteristics and properties associated with the use of the present macromonomers. For example, macromonomers prepared according to the present invention may be used in graft or comb polymers which polymers result in improved coating properties, for example improved VOC (content of volatile organic compounds), better crosslink density, better pot life, better environmental resistance, faster cure, and improved hardness. Moreover, such improved properties may even be obtained with a lesser overall number of functional groups which, however, are better distributed.

In general, macromonomer prepared according to the present process can be use to make block polymers, branched polymers, non-aqueous dispersion polymers, star polymers, and ladder polymers, which in turn have various uses appreciated by those skilled in the art. For providing an example of the use of macromonomers in coating compositions, commonly-assigned copending application Ser. No. 08/104,957, filed cocurrently, is herein incorporated by reference in its entirety.

Although applicants do not wish to be bound by any theory, it is believed that, when employing the present oligomeric chain transfer agents, the attendant macromonomer molecular weight control occurs because the oligomer can, in addition to copolymerizing normally, also undergo a beta-scission reaction. This beta-scission reaction causes part of a oligomer molecule to become attached to the other end of the growing polymer molecule, thus terminating its growth. The detached portion of the oligomer, now containing a free radical center, propagates by addition to free monomers in the reaction system. To the extent that normal copolymerization is also taking place, there will be additional oligomeric units randomly incorporated along the polymer chain. If beta-scission is made to predominate over normal copolymerization, then telechelic polymers having a functional group attached to the end of the polymer may be produced at high levels. Although illustrated with a particular X group, from the above formula, the following kind of reaction mechanism is believed to occur.

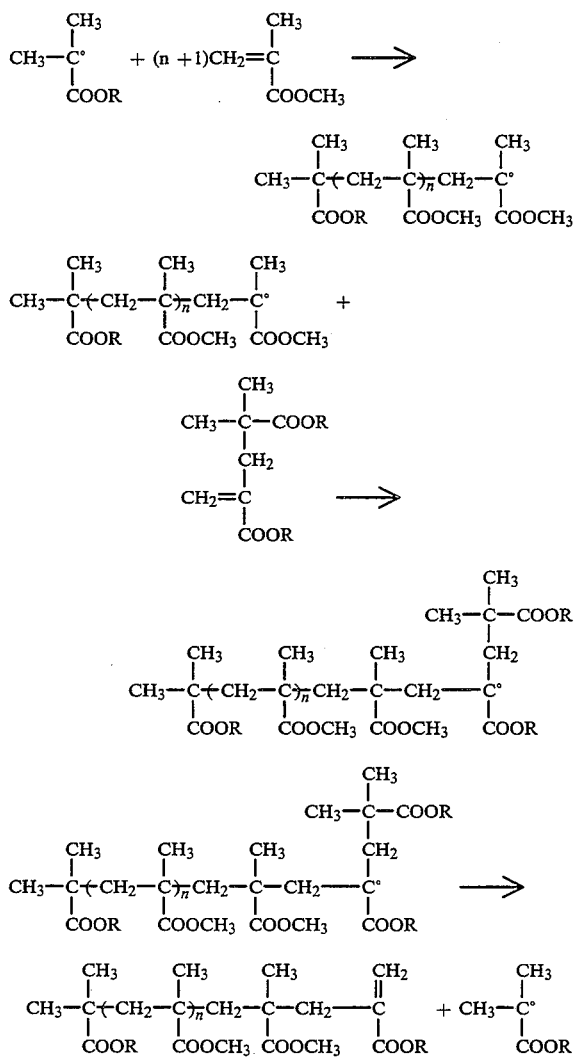

In consequence of the above-mentioned beta-scission reaction, that occurs, it is possible for every macromonomer molecule produced to have one carbon-carbon bond that can copolymerize with other monomers. This reaction sequence is especially useful for preparing acrylic, vinyl terminated macromonomers. Accordingly, the chain transfer agent is used to control molecular weight as well as providing a route to vinyl or ethylenically terminated macromonomers.

The present invention for producing macromonomers involves free radical polymerization of unsaturated monomers, some of which may carry functional groups for later crosslinking. This polymerization may occur in suspension, emulsion or solution, in aqueous or organic media, as will be familiar to those skilled in the art.

The oligomeric chain transfer agents employed in the present invention are typically prepared by standard solution polymerization techniques, but may also be prepared by emulsion, suspension or bulk polymerization processes. Preferably, a metal chelate chain transfer catalyst is employed in the method of preparation.) In effect, one chain transfer agent is used to make another chain transfer agent.) Such a method is disclosed in the above mentioned U.S. Pat. No. 4,680,352, issued to Janowicz et al. and U.S. Pat. No. 4,694,054, issued to Janowicz, both of which are commonly assigned and hereby incorporated by reference in their entirety, as well as WO 87/3605 published on Jun. 18, 1987.

When employing a cobalt chelate in the preparation of the present oligomers, it may be feasible to remove cobalt as well as any color from the reaction product by precipitation with a solvent and the subsequent use of activated charcoal. For example, the addition of ethyl acetate (Rhone-Poulenc AR grade, 99.5%, 0.005% acetic acid) in various proportions has been found to cause substantial precipitation of cobalt as a dark brown solid and therefore decreased color in the final solution. Other precipitating solvents include a mixture of acetone and ater and a mixture of acetonitrile and water. Color may be further removed by classical techniques, for example, simple treatment with activated charcoal for about 15 minutes followed by filtration though a short column packed with CELITE ™ 545 filter aid.

For larger scale production, continuous (CSTR) production of the oligomer may be more economical.

In general, to obtain some of the relatively lower molecular weight oligomeric chain transfer agents of the present invention, one could employ higher amounts of a metal chelate chain transfer agent than employed in the prior art for obtaining relatively higher molecular weight macromonomers. In other words, essentially the same prior art processes used in making low molecular weight macromonomers can be used in making the present relatively low molecular weight oligomeric chain transfer agents, such as dimers and trimers.

An initiator which produces carbon-centered radicals, sufficiently mild not to destroy the metal chelate chain transfer agent, is typically also employed in preparing the oligomeric chain transfer agents. Suitable initiators are azo compounds, as described below.

The kind of reaction sequence which is preferably employed for preparing the present oligomeric chain transfer agents, although with reference to the particular case where X is —COOCH$_3$ in the above formula, is illustrated as follows.

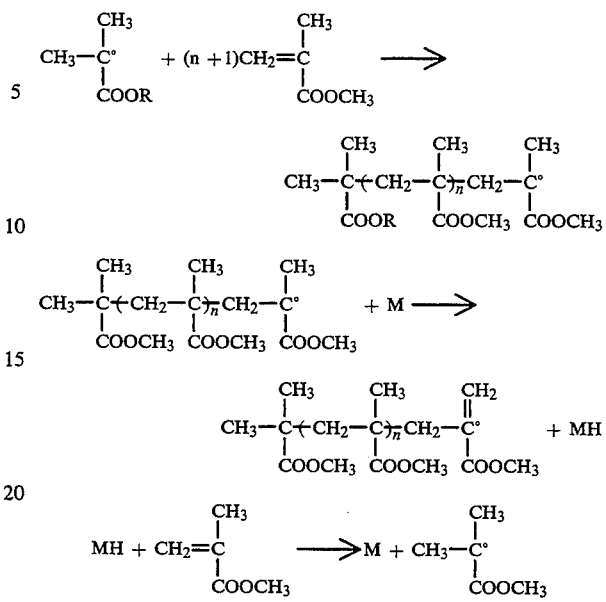

wherein "M" is a metal chelate catalytic chain transfer agent such as one of the cobalt complexes known to those of skill in the art.

As will be apparent to one skilled in the art, these oligomers could also be prepared in situ from appropriate reactants, although they are preferably made separately and then added to the polymerization reaction mixture.

The macromonomer polymerization process according to the presently claimed invention, in which macromonomers (terminally unsaturated polymers or copolymers) are produced employing the above described oligomeric chain transfer agents, is suitably carried out at 20° to 200° C., preferably 40°–160° C., more preferably 50°–145° C.

Any source of radicals or any of the known class of polymerization initiators is suitable, provided the initiator has the requisite solubility in the solvent or monomer mixture chosen and has an appropriate half life at the temperature of polymerization. Polymerization initiators may be redox or thermally or photochemically induced, for example azo, peroxide, peroxyester, or persulfate. Preferably, the initiator has a half life of from about 1 minute to about 1 hour at the temperature of polymerization. Some suitable initiators include ammonium persulfate, azocumene; 2,2'-azobis(2-methyl)-butanenitrile; 4,4'-azobis(4-cyanovaleric acid); and 2-(t-butylazo)-2-cyanopropane. Other non-azo initiators having the requisite solubility and appropriate half life may also be used.

The macromonomer polymerization process can be carried out as either a batch, semi-batch, continuous, or feed process. When carried out in the batch mode, the reactor is typically charged with oligomeric chain transfer agent and monomer, or medium and monomer. To the mixture is then added the desired amount of initiator, typically such that the M/I (monomer to initiator) ratio is 10 to 200. In typical examples, the oligomeric chain transfer catalyst is added in the amount such that the catalyst/initiator or C/I ratio is in the range of 0.10 to 20. The mixture is heated for the requisite time, usually one-half hour to ten hours. In a batch process, the reaction may be run under pressure to avoid monomer reflux and the medium can be viewed as absorbing the reaction heat.

If the macromonomer polymerization is to be carried out as a feed system, the reaction may typically be carried out as follows. The reactor is charged with medium, typically an organic solvent. Into a separate vessel are placed the monomer and oligomer. In a separate vessel is added initiator and medium. The medium in the reactor is heated and stirred while the monomer, oligomeric chain transfer agent, and initiator solutions are introduced, for example by a syringe pump or other pumping device. The rate of feed is determined largely by the quantity of solution. When the feed is complete, heating may be continued for an additional half hour or more. Alternatively, all of the oligomeric chain transfer agent may be placed into a reactor with medium initially and monomers and initiator solution added over time.

In either type of process, the macromonomer product may be isolated by stripping off the medium and unreacted monomer or by precipitation with a non-solvent. Alternatively, the macromonomer solution may be used as such, if appropriate to its application.

As indicated earlier, the macromonomer polymerization process is suitably carried out with a variety of monomers in the reaction mixture employed to form the polymeric product.

As indicated above, the polymerization can be carried out either in the absence of, or in the presence of, a polymerization medium. Many common organic solvents are suitable as polymerization media. These include aromatic hydrocarbons, such as benzene, toluene and the xylenes; ethers, such as tetrahydrofuran, diethyl ether and the commonly available ethylene glycol and polyethylene glycol monoalkyl and dialkyl ethers, including the Cellosolves and Carbitols; alkyl esters of organic acids and mixed ester-ethers, such as monoalkyl ether-monoalkanoate esters of ethylene glycol. In addition, ketones, such as acetone, butanone, pentanone and hexanone are suitable, as are alcohols such as methanol, ethanol, propanol and butanol. It may be advantageous to use mixtures of two or more solvents. Certain solvents may be preferred for environmental or toxicological reasons.

A significant advantage of this method of preparing vinyl terminated macromonomers is that a wide variety of monomers can be polymerized without adversely affecting the molecular weight of the desired macromonomer product. As indicated earlier, typical methods of preparation of vinyl terminated macromonomers are subject to sensitivity to active proton containing monomers. An example would be cobalt porphorine and dioxime catalysts. U.S. Pat. No. 4,680,352 and subsequent patents to Janowicz et al. demonstrate typical examples. Such cobalt catalysts are used extensively to prepare vinyl terminated macromolecules, but have the disadvantage of not working well with hydroxyl and/or carboxyl containing monomer when used at low levels. Also, high level use of these catalysts may produce unacceptable color in the resin. In general, cobalt catalysts are less efficient with acrylate monomers.

In another aspect of the present invention, it is possible to produce terminally functional macromonomers. This is accomplished by the presence, in the reaction mixture, of an oligomeric chain transfer agent which has at least one reactive functional group, for example, hydroxy (OH), carboxylic acid (—COOH), epoxy, isocyanato, amide, amine, silyl, and the like.

The macromonomer products so produced may be referred to as telechelic or pseudo-telechelical polymers. The key feature, in this case, is utilization of very low molecular weight ω-unsaturated oligomeric chain transfer agents which have been made from functional group containing monomers, in the polymerization of a desired monomer composition. The chain tranfer agents are thus used to control molecular weight as well as providing a route to terminally functionalized macromolecules. In the chain transfer step, the propagating radical will contain the desired functional group, thus providing an initiating terminus with functionality also. When using an initiator containing the desired functional group, the polymers produced will have a higher degree of functionality at both terminus.

For example, a hydroxy terminated polymer of methyl methacrylate, having a molecular weight ($M_n$) of 2000 (DP=20), can be produced by polymerizing methyl methacrylate monomer with a hydroxyl containing radical initiator in the presence of an oligomeric chain transfer agent made from hydroxyethyl methacrylate having a DP equal to 2. The chain transfer process, by definition, terminates the growing radical chain. A specific end group is placed at the end of the polymer which in this case is a hydroxyethyl methacrylic group. In concert with this transfer, a hydroxymethacrylate radical is produced, which becomes the new propagating radical.

Pseudo-telechelics are polymers defined as telechelical in nature, but also having low levels of functional monomer between the end monomers. In making macromomer polymers, functional oligomeric chain transfer agents having greater than two functional units on the oligomer provides multiple functional groups at one end of the macromonomers and one functional group at the other end. This method could be used to insure that a very high percentage of the macromonomers would contain at least two cross-linkable sites. Such macromonomers are useful for making block polymers, branched polymers, non-aqueous dispersion polymers, star polymers, and ladder polymers.

Thus, according to one aspect of the present invention, terminally functional macromonomers which are telechelics and/or pseudo-telechelics can be prepared advantageously and inexpensively.

EXAMPLE 1

This example illustrates the preparation of a pMMA oligomeric chain transfer agent such as employed in the present invention. A reactor was equipped with a stirrer, thermocouple, and condensor. The reactor was held under nitrogen positive pressure and the following ingredients were employed.

|  | Parts by Weight (Wt.) |
|---|---|
| Part 1 | |
| Ethyl acetate | 248.66 |
| Methyl methacrylate | 499.07 |
| Part 2 | |
| Ethyl acetate | 87.25 |
| Catalyst* | 0.3540 |
| Part 3 | |
| Methyl methacrylate | 1996.71 |
| Part 4 | |
| VAZO 52 ™ initiator | 19.62 |

|  | Parts by Weight (Wt.) |
| --- | --- |
| Ethyl acetate | 848.33 |

*diaquobis(borondifluorodiphenyl-glyoximato) cobaltate (II)

Part 1 was charged to the reactor and heated to 80° C. When the temperature stabilized at 80° C., Part 2 was charged to the reactor as a single shot feed. Part 3 (the monomer feed) and Part 4 (the initiator feed) were added concurrently, except that Part 3 was added over 240 minutes and Part 4 was added over 300 minutes. When the initiator feed in complete, the reaction mixture is held for 30 minutes. The solvent and unreacted monomer are then distilled off.

EXAMPLE 2

This example illustrates the preparation of a EMA/BMA oligomeric chain transfer agent such as employed in the present invention, wherein EMA is ethyl methacrylate and BMA is butyl methacrylate. A reactor was equipped with a stirrer, thermocouple, and condensor. The reactor was held under nitrogen positive pressure and the following ingredients were employed.

|  | Parts by Weight |
| --- | --- |
| Part 1 |  |
| Ethyl acetate | 248.66 |
| Ethyl methacrylate | 250.00 |
| Butyl methacrylate | 250.00 |
| Part 2 |  |
| Ethyl acetate | 87.25 |
| Catalyst* | 0.3540 |
| Part 3 |  |
| Ethyl methacrylate | 998.36 |
| Butyl methacrylate | 998.36 |
| Part 4 |  |
| VAZO 52 ™ initiator | 19.62 |
| Ethyl acetate | 648.33 | diaquobis(borondifluorodiphenyl-glyoximato) cobaltate (II)

Part 1 was charged to the reactor and heated to 80° C. When the temperature stabilized at 80° C., Part 2 was charged to the reactor as a single shot feed. Part 3 (the monomer feed) and Part 4 (the initiator feed) were added concurrently, except that Part 3 was added over 240 minutes and Part 4 was added over 300 minutes. When the initiator feed in complete, the reaction mixture is held for 30 minutes. The solvent and unreacted monomer are then distilled off.

EXAMPLE 3

This example illustrates a method of preparing a oligomeric chain transfer agent comprising glycidyl methacrylate monomeric units. A dry reactor was equipped with a stirrer, thermocouple, and condensor. The reactor was held under nitrogen positive pressure and the following components were introduced, as explained below.

|  | Wt. (g) |
| --- | --- |
| Part 1 |  |
| Ethyl acetate | 248.66 |
| Glycidyl methacrylate (GMA) | 499.07 |
| Part 2 |  |
| Ethyl acetate | 87.25 |
| Catalyst* | 2.50 |
| Part 3 |  |
| GMA | 1996.71 |
| Part 4 |  |
| VAZO ™ 52 | 19.62 |
| Ethyl acetate | 648.33 |

*diaquobis(borondifluorodiphenyl-glyoximato) cobaltate (II)

Part 1 was introduced into reactor and heated to 80° C. Part 2 was charged to the reactor in a single shot. When temperature stabilized, Part 3 and 4 were charged to the reactor over 240 and 300 minutes, respectively. At the completion of adding Part 3, the reactor was held at temperature for 30 minutes before cooling.

EXAMPLE 4

This example illustrates the preparation of an oligomeric chain transfer agent comprising monomeric units of gamma-methacryloxypropyl trimethoxy silane (MPTMS) by a continuous polymerization process. A dry reactor was equipped with a stirrer, thermocouple, and condensor. The reactor was held under nitrogen positive pressure and the following components were introduced, as explained below.

|  | Wt. (lbs) |
| --- | --- |
| Monomer Feed |  |
| MPTMS | 636.74 |
| Co(II)(DPG-BF$_2$)$_2$H$_2$O | 0.26 |
| Initiator Feed 1 |  |
| VAZO ™ 52 | 3.95 |
| Toluene solvent | 80.74 |
| Initiator Feed 2 |  |
| VAZO ™ 52 | 3.95 |
| Toluene solvent | 80.74 |

The present continuous stirred tank acrylic polymerization process is comprised of three in-series 10 gallon reactors. Reactor 1 and 2 are filled with toluene solvent and brought up to reflux. Part 1 (monomer and cobalt complex) are fed into Reactor 1 at 0.79 lb/minute for 806 minutes. Part 2 (Initiator Feed 1) and Part 3 (Initiator Feed 2) are delivered to Reactor 1 and 2, respectively, concurrently with the Part 1, each at 0.169 lb/minute for 500 minutes. Reactor 3 is held at 110° C. to strip solvent.

EXAMPLE 5

This example illustrates a continuous polymerization process for the preparation of an oligomeric chain transfer agent which is the copolymerization product of hydroxyethyl methacrylate (HEA) and methyl methacrylate (MMA) monomers in the weight ratio of HEA/MMA of 80:20. A dry reactor was equipped with a stirrer, thermocouple, and condensor. The reactor was held under nitrogen positive pressure and the following components were introduced, as explained below.

|  | Wt. |
| --- | --- |
| Monomer Feed |  |
| HEMA | 59.05 |
| MMA | 1476.4 |
| Initiator Feed for Reactor 1 |  |

-continued

| | Wt. |
|---|---|
| VAZO ™ 52 | 49.2 |
| MEK (methyl ethyl ketone) solvent | 486.1 |
| Co(II)(DPG-BF$_2$)$_2$2H$_2$O | 1.2 |
| Initiator Feed for Reactor 2 and 3 | |
| VAZO ™ 52 | 196.9 |
| MEK solvent | 1944.3 |

The present continuous stirred tank acrylic polymerization process is comprised of three in-series reactors. Reactors 1, 2 and 3 are filled with MEK solvent and brought up to reflux. The monomer feed is fed into Reactor 1 only at 12.30 g/minute. The initiator feed for Reactor 1 is delivered into Reactor 1, concurrently with the monomer reed, at 0.89 g/minute. Initiator feeds 2 and 3 are delivered to Reactors 2 and 3, respectively, at a rate of 3.67 g/minute. The product oligomer is collected as it flows out of Reactor 3. Solvent removal can take place to provide a product at higher concentration.

EXAMPLE 6

This example illustrates a method of preparing a macromomoner consisting of GMA/STY/BMA/BA in the weight ratio of 30:17.5:35:17.5 in which the aforesaid acronyms respectively respresent glyicidyl methacrylate, styrene, butyl methacrylate, and butyl acrylate. The chain transfer agent comprised glycidyl methacrylate, that is, the chain transfer agent was glycidyl (epoxy) functional. A one liter reactor was equipped with a stirrer, thermocouple, and condensor. The reactor was held under nitrogen positive pressure and the following components were introduced, as explained below.

| Part | Ingredient | Grams |
|---|---|---|
| I | GMA oligomer | 70.0 |
| | t-Butyl peroxyoctoate | 1.0 |
| | Xylenes | 50.0 |
| II | Xylenes | 50.0 |
| | t-Butyl peroxyacetate | 4.0 |
| III | Styrene | 40.0 |
| | Butyl methacrylate | 80.0 |
| | Butyl acrylate | 40.0 |

Part I was charged into the reactor and heated to 120° C. for 45 minutes. The temperature was increased to 130° C. and Part II and III were fed concurrently into the reactor over 300 and 240 minutes, respectively. After completing the addition of Part II, the reactor contents were held at 130° C. for an additional 60 minutes. The solids content was measured at 68.7%. The macromonomer product had an $M_n$ of 1736 and an $M_w$ of 5469. The Brookfield viscosity at 22.2° C. was measured at 20 RPM at 4.0 poise and at 50 RPM at 3.9 poise.

EXAMPLE 7

This example illustrates a method of preparing a macromomoner consisting of GMA/STY/BMA/BA in the weight ratio of 33:17:33:17 in which the aforesaid acronyms respectively respresent glyicidyl methacrylate, styrene, butyl methacrylate, and butyl acrylate. The chain transfer agent comprised glycidyl methacrylate, that is, the chain transfer agent was glycidyl (epoxy) functional. A one liter reactor was equipped with a stirrer, thermocouple, and condensor. The reactor was held under nitrogen positive pressure and the following components were introduced, as explained below.

| Part | Ingredient | Grams |
|---|---|---|
| I | GMA oligomer | 80.0 |
| | t-Butyl peroxyacetate | 1.0 |
| | Xylenes | 50.0 |
| II | Xylenes | 50.0 |
| | t-Butyl peroxyacetate | 3.0 |
| III | Styrene | 40.0 |
| | Butyl methacrylate | 80.0 |
| | Butyl acrylate | 40.0 |

Part I was charged to the reactor and heated to 120° C. for 45 minutes. The temperature was then increased to 130° C. and Part II and III were fed concurrently to reactor over 300 and 240 minutes, respectively. After completing the addition of Part II, the reactor contents were held at 130° C. for an additional 60 minutes. The solids content was measured at 69.8%. The macromonomer product had an $M_n$ of 1967 and an $M_w$ of 5681.

EXAMPLE 8

This example illustrates a method of preparing a methyl methacrylate macromonomer from a oligomeric chain transfer agent. In this case, the chain transfer agent was a methyl methacrylate (MMA) oligomer which was premixed with the monomer mixture prior to initiating the polymerization reaction. The following components were obtained:

| Part | Ingredients | Wt. (g) |
|---|---|---|
| I | Ethyl acetate | 50.00 |
| II | Ethyl acetate | 30.00 |
| | VAZO 52 ™ initiator | 0.2000 |
| III | Methyl methacrylate monomer | 90.00 |
| | MMA oligomer | 20.00 |

Part I was charged to a 250 ml reactor equipped with a stirrer, thermocouple, nitrogen positive pressure, and a condenser. The mixture was heated to 80° C. Part II was charged to the initiated feed vessel, premixed, and added to the reactor over 460 minutes concurrently with the monomer feed of Part III. Part III was charged to the monomer vessel and added to the reactor over 240 minutes. The reaction was then held for 60 Minutes at the end of the inititor feed.

EXAMPLE 9–10

These examples illustrate a method of preparing a methyl methacrylate macromonomer from a oligomeric chain transfer agent. In this case, the chain transfer agent was, for each of Example 9 and 10, a methyl methacrylate (MMA) oligomer having a weight average molecular weight of 290 and 364, respectively. For each of examples 9 and 10, the oligomer chain transfer agent is placed in its entirety in the reactor with the solvent. The following components were obtained:

| Part | Ingredients | Ex. 9 Wt. (g) | Ex. 10 Wt. (g) |
|---|---|---|---|
| I | Ethyl acetate | 50.00 | 50.00 |
| | MMA oligomer ($M_n$ = 290) | 20.00 | — |
| | MMA oligomer ($M_n$ = 364) | — | 20.00 |
| II | Ethyl acetate | 30.00 | 30.00 |
| | VAZO 52 ™ initiator | 0.2000 | 0.2000 |

-continued

| Part | Ingredients | Ex. 9 Wt. (g) | Ex. 10 Wt. (g) |
|------|-------------|---------------|----------------|
| III  | MMA         | 90.00         | 90.00          |

Part I was charged to a 250 ml reactor equipped with a stirrer, thermocouple, nitrogen positive pressure, and a condenser. The mixture was heated to 80° C. Part II was charged to the initiated feed vessel, premixed, and added to the reactor over 460 minutes concurrently with the monomer feed of Part III. Part III was charged to the monomer vessel and added to the reactor over 240 minutes. The reaction was then held for 60 Minutes at the end of the inititor feed.

EXAMPLE 11

This example illustrates the effectiveness of the pure trimer of methylmethacrylate (MMA trimer) as a chain transfer agent to produce a macromonomer according to the present invention. The following components were introduced as explained below.

| Part | Ingredients | Wt. (g) |
|------|-------------|---------|
| I    | Ethyl acetate | 50.00 |
|      | MMA trimer  | 15.15   |
| II   | Ethyl acetate | 30.00 |
|      | VAZO 52 TM initiator | 0.2000 |
| III  | Methyl methacrylate monomer | 90.00 |

Part I was charged to a 250 ml reactor equipped with a stirrer, thermocouple, nitrogen positive pressure and a condensor. The mixture was heated to 80° C. Part II was charged to the initiator feed vessel, premixed, and added to the reactor over 460 minutes concurrently with the monomer feed vessel and added to the reactor over 240 minutes. The reaction was then held for 60 minutes at the end of the initiator feed. The results for example 8–11 are shown in Table 1 below.

TABLE 1

| Example | Grams CTA (Location) | CTA Molec. Wt. (D) | $M_n$ (D) | Vinyl % (TGA) |
|---------|----------------------|--------------------|-----------|---------------|
| 8       | 20.0 (Monomer feed)  | 290 (1.3)          | 8437 (1.81) | 82%         |
| 9       | 20.0 (Reactor)       | 290 (1.3)          | 7563 (1.69) | 85%         |
| 10      | 20.0 (Reactor)       | 364* (1.2)         | 4982 (1.96) | 94%         |
| 11      | 15.15 (Reactor)      | 300 (only trimer)  | 5039 (1.72) | 90%         |

*MMA oligomer distribution as in Example 8 & 9 but with dimer MMA removed.

EXAMPLES 12–13

These examples illustrate a method of preparing a butyl methacrylate and hydroxyethyl methacrylate copolymer macromonomer using pMMA oligomer as a chain transfer agent. In this case, the chain transfer agent was a methyl methacrylate (pMMA) oligomer distribution with an $M_n = 364$. For example 12, the following components were obtained:

| Part | Ingredients | Wt. (g) |
|------|-------------|---------|
| I    | Ethyl acetate | 50.00 |
|      | MMA oligomer | 18.00  |
| II   | Ethyl acetate | 30.00 |
|      | VAZO 52 TM initiator | 0.2000 |
| III  | Butyl methacrylate | 45.00 |
|      | Hydroxyethyl methacrylate | 37.00 |

Part I was charged to a 250 ml reactor equipped with a stirrer, thermocouple, nitrogen positive pressure, and a condenser. The mixture was heated to 80° C. Part II was charged to the initiated feed vessel, premixed, and added to the reactor over 460 minutes concurrently with the monomer feed of Part III. Part III was charged to the monomer feed vessel and added to the reactor over 240 minutes. The reaction was then held for 60 minutes at the end of the inititor feed. For example 13, the same method was followed except that ethyl and hydroxy propyl methacrylate was use in Part III. The results of Examples 12–13 above are shown in Table 2 below:

TABLE 2

| Example | Percent Monomer Compostion (Wt.) | $M_n$ | Vinyl termination %[a] |
|---------|----------------------------------|-------|-------------------------|
| 12      | BMA/HEMA/M-MA[b] (45:37:18)      | 3251  | ¢95%                    |
| 13      | EMA/HPMA/M-MA[b] (50:32:18)      | 3000  | ¢95%                    |

[a] By TGA analysis
[b] MMA as pMMA oligomer chain transfer agent

EXAMPLE 14

This example illustrates a method of preparing a butyl methacrylate and ethyl methacrylate copolymer macromonomer using oligomeric GMA (glycidyl methacrylate) as a chain transfer agent. The following components are employed:

| Part | Ingredients | Wt. (g) |
|------|-------------|---------|
| I    | Ethyl acetate | 50.00 |
|      | GMA oligomer | 25.00  |
| II   | Ethyl acetate | 30.00 |
|      | VAZO 52 TM initiator | 0.2000 |
| III. | Ethyl methacrylate | 50.00 |
|      | Butyl methyacrylate | 25.00 |

Part I is charged to a 250 ml reactor equipped with a stirrer, thermocouple, nitrogen positive pressure and a condenser. The mixture is heated to 80° C. Part II is charged to the initiated feed vessel, premixed, and added to the reactor over 460 minutes concurrently with the monomer feed of Part III. Part III is charged to the monomer feed vessel and added to the reactor over 240 minutes. The reaction is then held for 60 minutes at the end of the inititor feed.

EXAMPLE 15

This example illustrates a method of preparing a butyl methacrylate macromonomer using oligomeric gamma-(triethoxysilyl)propyl methacrylate (TEOSPMA) as a chain transfer agent. The following components are employed:

| Part | Ingredients | Wt. (g) |
|------|-------------|---------|
| I    | Ethyl acetate | 50.00 |

| Part | Ingredients | Wt. (g) |
|---|---|---|
|  | TEOSPMA oligomer | 35.00 |
| II | Ethyl acetate | 30.00 |
|  | VAZO 52 ™ initiator | 0.2000 |
| III | Butyl methyacrylate | 65.00 |

Part I is charged to a 250 ml reactor equipped with a stirrer, thermocouple, nitrogen positive pressure and a condenser. The mixture is heated to 80° C. Part II is charged to the initiated feed vessel, premixed, and added to the reactor over 460 minutes concurrently with the monomer feed of Part III. Part III is charged to the monomer feed vessel and added to the reactor over 240 minutes. The reaction is then held for 60 minutes at the end of the inititor feed.

EXAMPLE 16

This example illustrates a method of preparing a butyl methacrylate macromonomer using the oligomeric polymer of hydroxyethylmethacrylate (HEMA) as a chain transfer agent. The following components are employed:

| Part | Ingredients | Wgt (g) |
|---|---|---|
| I | Methyl ethyl ketone | 25.00 |
|  | HEMA oligomer | 30.00 |
| II | Methyl ethyl ketone | 30.00 |
|  | VAZO 52 ™ initiator | 0.3000 |
| III. | Butyl methacrylate | 60.00 |
|  | HEMA | 10.00 |

Part I was charged to a 250 ml reactor equipped with a stirrer, thermocouple, nitrogen positive pressure and a condenser. The mixture was heated to 80° C. Part II was charged to the initiated feed vessel, premixed, and added to the reactor over 360 minutes concurrently with the monomer feed of Part III. Part III was charged to the monomer feed vessel and added to the reactor over 200 minutes. The reaction was then held for 60 minutes at the end of the inititor feed.

The best mode presently contemplated for carrying out the invention is represented by the disclosure and claims herein, it being understood that selection of the best mode will depend on a variety of factors, including the monomers being polymerized, the particular chain transfer agent, and the initiator employed, and the amounts thereof, and the polymerization conditions, such as temperature, pressure, conversion, and yield.

We claim:

1. A method of preparing a macromonomer composition by free radical polymerization of unsaturated monomers wherein said macromonomer composition has a degree of polymerization ranging from 10 to 800, said method comprising the reaction of a mixture comprising:

(a) for chain transfer, an oligomer, or a molecular weight distribution of oligomers, having the following end group:

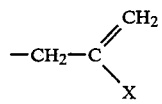

where X is $-CONR_2$, $-COOR$, $OR^1$, $-OCOR$, $-OCOOR^1$, $-NRCOOR^1$, halo, cyano, or a substituted or unsubstituted phenyl or aryl, wherein each R is independently selected from the group consisting of hydrogen, silyl, or a substituted or unsubstituted alkyl, alkyl ether, phenyl, benzyl, and aryl, wherein substituted means with a substituent selected from the group consisting of epoxy, hydroxy, isocyanato, cyano, amino, silyl, acid, halo, or acyl; and wherein $R^1$ is the same as R except not H; and wherein each alkyl is independently selected from the group consisting of branched or unbranched hydrocarbons having 1 to 12 carbon atoms or cyclical hydrocarbons having 4 to 12, preferably 5 to 6 carbon atoms; and halo or halogen is bromo, iodo, chloro or fluoro; except excluding the use of a pure dimer when X is substituted or unsubstituted phenyl or aryl; and (b) a mixture of ethylenically unsaturated monomers 80-100% by weight of which are monomers selected from the group consisting of methacrylates of the formula $CH_3=C(CH_3)CO_2J$ wherein J is H, $C_1-C_{12}$ alkyl, $C_2-C_{12}$ alkenyl, glycidyl, $C_2-C_{12}$ hydroxyalkyl, $C_xH_{(2x+1-y)}F_y$ where x is 1 to 16 and y is 0 to $2x+1$; $R_6R_7N(CH_2)_z$ where $R_6$ and $R_7$ are independently $C_1$ to $C_{12}$ alkyl and z is 1 to 10, or $R_8R_9R_{10}Si(CH_2)z$ where $R_8$, $R_9$ and $R_{10}$ are independently $C_1$ to $C_{12}$ alkyl or $C_1$ to $C_{12}$ alkoxy and z is 1 to 10, and mixtures thereof;

such that as a result of reacting the aforesaid mixture at least 80 mol percent of the macromonomer composition has said end group.

2. The method of claim 1, wherein the mixture of monomers in (b) is 80-100% by weight of monomers selected from the group consisting of methacrylic acid, alkyl esters of methacrylic acid, and functional alkyl esters of methacrylic acid.

3. The method of claim 1 wherein the mixture of monomers in (b) is up to 20% by weight of monomers selected from the group consisting of methacrylonitrile, maleic anhydride; methacrylamide derivatives of the formula $CH_2=C(CH_3)CON(R)_2$ and vinyl esters of the formula $CH_2=CHOOCR$ wherein R is H or $C_1$ to $C_{10}$ alkyl, and mixtures thereof.

4. The method of claim 1, wherein the mixture of monomers in (b) is up to 20% by weight of monomers selected from the group consisting of vinyl halides of the formula $CH_2=CHX$ wherein X is Cl or F; vinylidene halides of the formula $CH_2=C(X)_2$ wherein each X is independently Cl or F; substituted butadienes of the formula $CH_2=C(R)C(R)=CH_2$ wherein each R is independently H, $C_1$ to $C_{10}$ alkyl, Cl or F; ethylenesulfonic acid derivatives of the formula $CH_2=CHSO_3X$ wherein X is Na, K, Li, $N(R)_4$, H, R or $(CH_2)_n Z$ where n is an integer from 1 to 10, Z is COOY, OH, $N(R)_2$, or $SO_3Y$, Y is H, Li, Na, K or N(R) and R is independently $C_1$ to $C_{10}$ alkyl; acrylamide derivatives of the formula $CH_2=CHCON(R)_2$ wherein each R is independently H, $C_1$ to $C_{10}$ alkyl, or $(CH_2)_nZ$, n is an integer from 1 to 10, Z is COOY, OH, $N(R_1)_2$ or $SO_3Y$ and Y is H, Li, Na, K or $N(R_1)_4$ where R is $C_1$ to $C_{10}$ alkyl; and mixtures thereof.

5. The method of claim 1, wherein at least a portion of said mixture of monomers has a reactive functionality which, on the macromonomer product, is capable of crosslinking with another reactive functionality on another polymer.

6. The method of claim 5, wherein the reactive functionality is selected from the group consisting of hydroxyl, epoxy, anhydride, carboxyl, silyl, amide, amine, and isocyanato functionalities.

7. The method of claim 1, wherein the macromonomer composition has 10 to 300 monomeric units.

8. The method of claim 1 wherein the average molecular weight of the macromonomer product is 1000 to 10,000.

9. The method of claim 1, wherein said polymerization is conducted in the presence of an effective amount of said oligomer, or molecular weight distribution of oligomers, having the following formula:

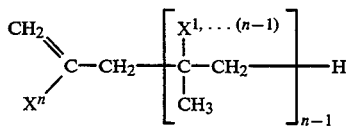

wherein n is on average 2 to 100 and $X^1$ to $X^n$ are independently X as defined above.

10. The method of claim 1, wherein polymerization is conducted in the presence of an oligomer, or molecular weight distribution of oligomers, in which X is $-CONR_2$, $-COOR$, or an unsubstituted or substituted phenyl or aryl, and R is as defined above.

11. The method of claim 1 wherein polymerization is conducted in the presence of an oligomer, or molecular weight distribution of oligomers, in which X is $-COOR$ or phenyl and R is alkyl or phenyl, either of which may be unsubstituted or substituted with epoxy, hydroxy, silyl or acid.

12. The method of claim 1, wherein polymerization is conducted in the presence of an effective amount of a oligomers, or molecular weight distribution of oligomers, having the following formula:

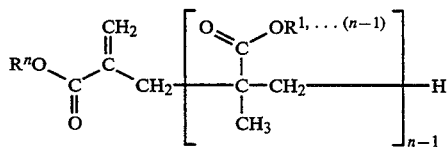

wherein n is, on average, 2 to 20 and $R^1$ to $R^n$ are each independently selected from the group consisting of hydrogen, substituted or unsubstituted alkyl, alkyl ether, phenyl, benzyl, or aryl, which substituent is selected from the group consisting of epoxy, hydroxy, isocyanato, cyano, amino, silyl, acid, anhydride, halo, or acyl; and each alkyl is independently selected from the group consisting of branched, unbranched, or cyclical hydrocarbons having 1 to 12 carbons, halo is selected from the group consisting of bromo, iodo, chloro and fluoro, and silyl is $-SiR^2(R^3)(R^4)$, wherein $R^2$, $R^3$, and $R^4$ are independently alkyl, phenyl, alkyl ether, or phenyl ether, wherein alkyl is as defined above.

13. The method of claim 1, wherein the polymerization is carried out in the presence of an initiator.

14. The method of claim 1, wherein the oligomer chain transfer agents employed in the present invention have a distribution of molecular weights and have a degree of polymerization ranging from 2 to 100.

15. The method of claim 10, wherein the oligomer chain transfer agents employed in the present invention have a distribution of molecular weights and have a degree of polymerization ranging from 2 to 20.

16. The method of claim 1, wherein n is on average 2 to 7.

17. The method of claim 1, wherein the oligomer chain transfer agent is comprised of alkyl methacrylate wherein the alkyl has 1 to 10 carbon atoms.

18. The method of claim 1, wherein the oligomer chain transfer agent is comprised of monomer units selected from the group consisting of methyl, ethyl, propyl and butyl methacrylate; fluorinated alkyl methacrylates, alpha-methyl styrene, hydroxyethyl methacrylate, glycidyl methacrylate, methacrylic acid, methacrylonitrile, and combinations thereof.

19. The method of claim 1, wherein the oligomer chain transfer agent, or distribution of such oligomers, are the product of a metal chelate chain transfer process.

20. The method of claim 1, wherein the effective amount of oligomer chain transfer agent is in the range of between 0.01% and 80% by weight of the monomers present.

21. The method of claim 17, wherein the effective amount is between 1 and 20% by weight.

22. The method of claim 1, wherein the macromolecule is employed to make a non-aqueous dispersed polymer, a microgel, a star polymer, a branched polymer, a ladder polymer, or a block polymer.

23. The method of claim 1, wherein the macromonomer product produced is pseudo-telechelical.

* * * * *